March 29, 1966   M. ACRI   3,242,752
ROLLER CHAIN FOR ENGINE VALVE-GEAR
Filed Aug. 11, 1964   2 Sheets-Sheet 1

March 29, 1966 M. ACRI 3,242,752
ROLLER CHAIN FOR ENGINE VALVE-GEAR
Filed Aug. 11, 1964 2 Sheets-Sheet 2

United States Patent Office 3,242,752
Patented Mar. 29, 1966

3,242,752
ROLLER CHAIN FOR ENGINE VALVE-GEAR
Mario Acri, Asti, Italy, assignor to Fabbriche Riunite
Way Assauto, Asti, Italy
Filed Aug. 11, 1964, Ser. No. 388,806
Claims priority, application Italy, Sept. 9, 1963,
18,785/63
4 Claims. (Cl. 74—245)

This invention relates to roller drive chains, more particularly for driving of auxiliary component elements of high-speed internal combustion engines.

It is known that roller drive chains, interconnecting sprockets which are closely spaced and mounted on non-adjustable axes, become noisy and inefficient even before their change in length due to wear beyond a tolerable limit for correct operation.

Attempts have been made to obviate the above drawback and increasing the useful chain life and improving the noise factor by a chain construction, reconciling contrary requirements of a short pitch in order to facilitate bending of the chain as it travels around the sprocket and of a pitch as long as possible at the region where the chain is stretched, particularly over its driven run. Chains heretofore manufactured had stop levers placed in a proper alternation on a pin or bushing in order to prevent curving of the chain sections around the pivots on which the levers are mounted and towards the sprocket wheels, particularly over the slack portion of the chain. Such a construction is exemplified, e.g., by U.S. Patent 2,715,340, issued August 17, 1955 to applicant.

Chains of the above type have been fitted with stop levers at alternate links which prevented the angular bending between two adjacent links beyond a predetermined angle.

These chains proved useful whenever their speed did not exceed certain given limits, as it is encountered with engines in conventional cars.

However, it has been ascertained that as the speed increases to a higher value as well as under certain conditions of wear of the sprockets, the stop levers do not maintain their initial angular position with respect to the chain components, and thus become gradually more inefficient.

Chains of the type specified are moreover objectionable in that by using simply levers attached to the pins or bushings a disproportion arises between the actual strength and the weight of the lever. In addition there is often an insufficient resistance of the lever against angular displacement with respect to the component to which it is attached.

In other terms, a disproportion arises between the weight of the stop lever and the force which can be transmitted by the lever.

A further drawback of known chains resides in the fact that since the levers are mounted on one side of the chain, the latter becomes unbalanced. This results, particularly at high speed, in rubbing of the chain against one face of the tooth and against the circumferential portion of the sprocket wheel over which the chain travels. This rubbing adversely affects the stop levers, the sprocket wheels as well as the links of the chain.

An object of this invention is to obviate the abovementioned drawbacks and provide a chain which, while it retains all the advantages of previous chains provided with stop levers, it will also operate the relatively high speeds, required in present high-speed motor vehicle engines.

With the above objects in view this invention provides a roller drive chain particularly for the driving of auxiliary shafts in high-speed engines, of the type wherein adjacent pairs of pins and the bushings fitted on the pins are interconnected by links attached to the pins and bushings; respectively, at least on one side of the chain every alternate pin carrying a stop lever having bilateral arms each of which is adapted to engage the next pin in the adjacent pair and prevent, in the stretched condition of the chain, the bending in one direction beyond a predetermined limit.

Further characteristic features and advantages of this invention will be understood from the following description, given by way of example, with reference to the accompanying drawings in which.

Corresponding parts are provided with identical reference numerals throughout the figures.

Figure 1:
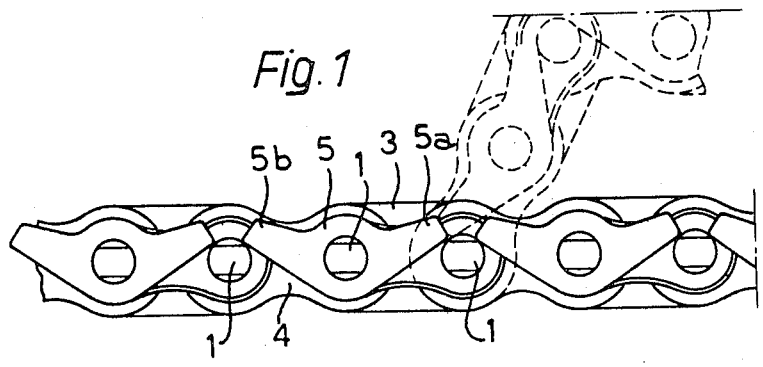
FIGURE 1 is a side elevational view of a preferred embodiment showing a length of chain incorporating stop levers of a particular construction.
Figure 2:
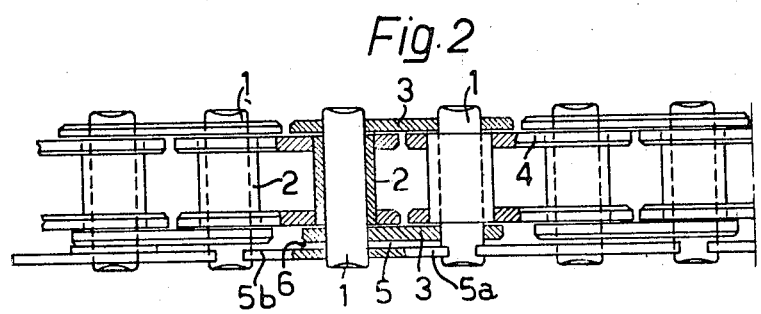
FIGURE 2 is a plan view with a portion shown in section.
Figure 3:
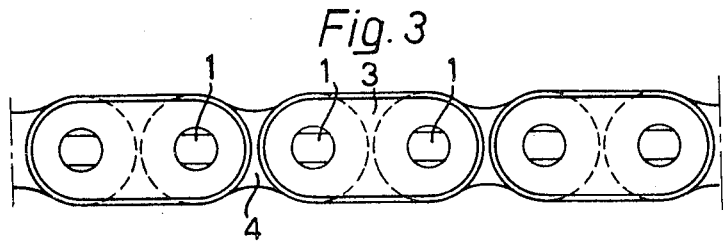
FIGURE 3 is a side elevational view from the opposite side of FIGURE 1.
Figure 4:
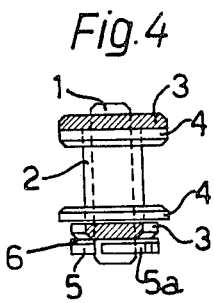
FIGURE 4 is a sectional view of a pin end bushing construction taken from FIGURE 2.

In the embodiment shown in FIGURES 1 to 4 bushings 2 are mounted on the chain pins 1. Consecutive pairs of pins 1 are interconnected by links 3, the bushings 2 fitted on the pins in each pair being connected with the bushings of adjacent pairs by links 4.

According to this invention stop levers 5 are secured to alternate pins 1. The levers 5 have bilateral arms terminating in slanting end faces 5a and 5b, respectively.

The bilateral arms of the levers 5, which are solidly attached to their respective pins, will abut, in the stretched condition of the chain, against the pins adjacent on both sides, of the lever supporting pin, preventing thereby the bending of the chain in one direction, whereas, in the other direction of bend the faces 5a and 5b engage each other whenever the angle of tilt exceeds a predetermined limit. This will correct undue slack of the chain and in addition forces each lever 5 to assume its normal position on the supporting pin if there should be a loosening of this attachment due to wear.

In the operation of the chain, links 3, 4 at the pins on which the stop levers 5 are mounted, are held solid which prevents the chain to sag over its power transmission portion and thus become noisy. However, the links 3 and 4 are free to bend around a sprocket over which the chain travels since there is no action which would prevent the freedom of articulation of the chain to take the necessary curvature.

A washer 6 is fitted on the pins carrying the stop levers 5 in order to prevent rubbing of the lever 5 against the link 3.

Another advantage of the invention residing in the particular link construction shown, especially in the shape and attachment of the stop levers, is that rotary displacement of the levers over the pins is either prevented or compensated. After continued use of a chain of this type the lever arms wil have the tendency to loosen, no matter how well they may be secured, to the particular pin. A loose lever will, obviously, defeat its purpose.

In the construction shown in FIGURES 1 to 4, the bilateral levers will realign themselves, even if loosened on the supporting pin, by the fact that upon engaging each other the forces acting between them will re-establish their original position.

Figure 5:
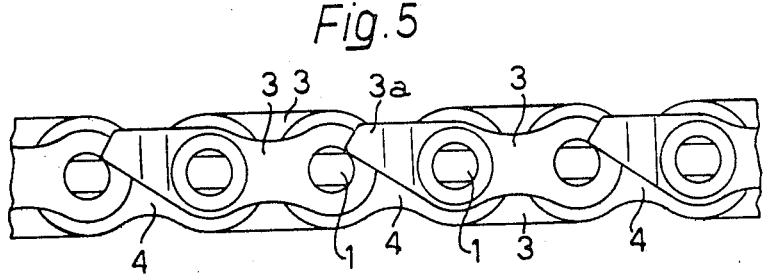
FIGURE 5 is a side elevational view of a modified form representing the use of single arm levers of particular construction.
Figure 6:
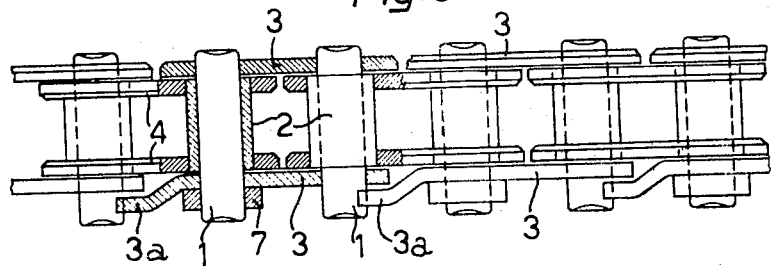
FIGURE 6 is a plan view having a sectional portion.
Figure 7:
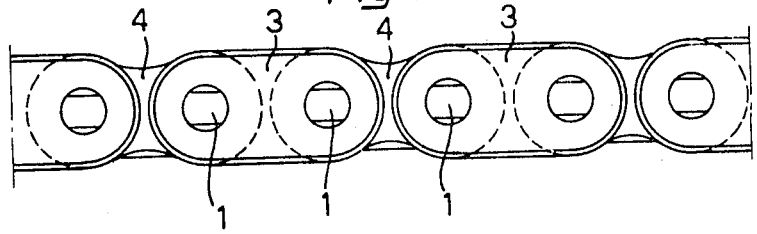
FIGURE 7 is a side elevational view from the opposite side of FIGURE 5.
Figure 8:
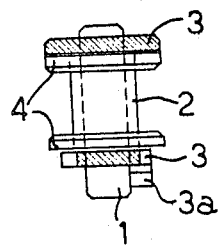
FIGURE 8 is a partially sectional view of a pin and bushing construction taken from FIGURE 6.

In the embodiment shown in FIGURES 5 to 8 the stop levers are of different construction. Instead of a bilateral lever attached to a link pin the acting arms 3a are part of the link member 3. Being of one-piece construction and not attached to any of the pins they cannot rotatably be displaced nor loosened and will maintain their original position. The arm 3a extends sufficiently to engage the adjacent pin for the purpose of preventing the bending of the chain between links in one direction. Freedom of bending in the other direction is, of course, not impaired.

To maintain a balance between the two sides of the chain as to weight distribution, the link members on the side not having lever arms are made thicker than those on the other side.

What I claim is:

1. In a roller transmission chain having a plurality of pivoting members and links interconnecting said members, the combination of stop levers attached to pins of alternate pivoting members, said levers having arms extending in both directions, and adapted to engage the pins of adjacent links to limit angular displacement thereof in one direction, and abutting each other for limiting angular displacement between links beyond a predetermined angle in the other direction.

2. In a roller transmission chain having a plurality of pivoting members and links interconnecting said members, the combination of stop levers attached to pins of alternate pivoting members, said levers comprising a central pin engaging portion and flat arms extending in both directions and adapted to engage at their bottom edge the pins of adjacent links to limit angular displacement thereof in one direction, and abutting each other for limiting angular displacement between links beyond a predetermined angle in the other direction.

3. In a roller transmission chain having a plurality of pivoting members and links interconnecting said members, the combination of stop levers attached to pins of alternate pivoting members, said levers comprising a central pin engaging portion and flat arms terminating in slanting end faces extending in both directions and adapted to engage at their bottom edge the pins of adjacent links to limit angular displacement thereof in one direction, and abutting at their slanting faces for limiting angular displacement between links beyond a predetermined angle in the other direction.

4. A roller transmission chain in accordance with claim 3, wherein the shape of said levers and the angle of slant of the end faces cooperate upon engagement to realign individual levers into set positions upon rotary displacement of any one of said levers over its supporting pin due to wear.

References Cited by the Examiner
UNITED STATES PATENTS

| | | | |
|---|---|---|---|
| 2,219,125 | 10/1940 | Bremer | 74—250 |
| 2,498,788 | 2/1950 | Bremer | 74—250 |
| 2,602,345 | 7/1952 | Braumiller | 74—250 |
| 2,715,340 | 8/1955 | Acri | 74—245 |
| 2,905,264 | 9/1959 | Dennis | 74—250 X |

DAVID J. WILLIAMOWSKY, *Primary Examiner.*

J. A. WONG, *Assistant Examiner.*